United States Patent [19]
Ruppel et al.

[11] Patent Number: 5,833,804
[45] Date of Patent: Nov. 10, 1998

[54] METHOD FOR APPLYING AN ADHESIVE, APPLICATOR DEVICE AND PRODUCT

[75] Inventors: Rémy Ruppel, Durrenentzen; Rémy Point; Gilles Roussel, both of Colmar, all of France

[73] Assignee: Fort James France, Kunheim, France

[21] Appl. No.: 553,668

[22] PCT Filed: Jun. 3, 1994

[86] PCT No.: PCT/FR94/00657

§ 371 Date: Jan. 2, 1996

§ 102(e) Date: Jan. 2, 1996

[87] PCT Pub. No.: WO94/29524

PCT Pub. Date: Dec. 22, 1994

[30] Foreign Application Priority Data

Jun. 3, 1993 [FR] France .................................. 93 06668

[51] Int. Cl.⁶ .................. B05D 5/10; B05C 1/16
[52] U.S. Cl. .......................................... 156/578; 118/249
[58] Field of Search .................................... 156/578, 324, 156/201, 210, 292, 462, 471, 547, 548, 549; 118/244, 246, 249

[56] References Cited

U.S. PATENT DOCUMENTS

| 1,124,858 | 1/1915 | Caruso et al. | 118/DIG. 7 |
| 3,867,225 | 2/1975 | Nystrand | 156/209 |
| 4,497,274 | 2/1985 | Focke | 118/248 X |

*Primary Examiner*—Francis J. Lorin
*Attorney, Agent, or Firm*—Breiner & Breiner

[57] ABSTRACT

A method for depositing an adhesive diluted in a solvent, such as water, onto a substrate, such as a paper sheet (13) illustratively of cellulose wadding, and supported on and moving with a rotary cylinder (9) using a deposition apparatus (20) comprising at least one adhesive reservoir (23) and one cylinder transferring the adhesive onto the substrate, characterized in that the cylinder (25') does not have surface asperities and comprises first zones (25a) and second zones (25b) such that the quantity of adhesive dragged by the cylinder (25') onto the second zones is greater than the quantity of adhesive dragged onto the first zones.

11 Claims, 1 Drawing Sheet

METHOD FOR APPLYING AN ADHESIVE, APPLICATOR DEVICE AND PRODUCT

The invention concerns the field of papers, in particular cellulose wadding, that is, absorbent paper for sanitary or household uses such as sanitary paper, paper towels, napkins, make-up removers, handkerchiefs or any similar product. Its object is an adhesive coating method and, in particular, a coating method allowing for the depositing of a minimal amount of adhesive to two mutually bonded paper sheets, in particular, made of cellulose wadding.

It is known in the field of sanitary and household papers, when manufacturing products such as sanitary paper, paper towels, and the like, to emboss paper sheets and to bond them to each other using adhesives.

A known procedure consists of embossing each paper sheet on an embossing unit composed of an engraved cylinder and a mating cylinder made of rubber, and in depositing the adhesive using an adhesive applicator onto the embossment of one of the sheets and to join the sheets using a laminator roll. This procedure allows for the creation of empty spaces between the sheets and thus a thick product with increased absorption relative to a sheet which was not embossed. However, the adhesive tends to stiffen the sheet and degrades softness.

U.S. Pat. No. 3,867,225 describes such a procedure wherein the plies are first embossed so as to provide projections of circular or elongated cross-sections and then are combined in such a manner that the projections of one of the plies nest between those of the other ply.

The bonding apparatus described in this patent consists of a combination of three rotary cylinders: a first cylinder drawing adhesive from a receptacle, a second cylinder receiving the adhesive from the first cylinder and transferring a metered amount to a third cylinder which implements adhesive deposition onto the projections of one of the plies. In order to keep the quantity of deposited adhesive within bounds, the third cylinder is engraved in such a manner that it comprises projections which alone are wetted by the second cylinder. As a result, the bonding surface between the two plies is limited to that subtended by the patterns of the projections of the depositing cylinder. In theory, this solution is satisfactory because good bonding is achieved while also controlling the sheet's stiffness. In operation, however, an amalgam composed of adhesive and fibers transferred from the sheet to the cylinder by the adhesion of the residual adhesive forms on the slopes of the projections of the third cylinder. Consequently, the apparatus is quickly fouled and product quality is degraded. Further, there is danger of destroying the rubber cladding by overheating. Therefore, frequent cleaning stops are required. A scraper cannot resolve the problem because it will not scrape the slopes of the projections.

A similar solution is offered in U.S. Pat. No. 3,672,949 to combine the plies not by meshing the projections but by combining tips against tips. In this procedure, the adhesive is deposited in a pattern of crossed lines using a bonding cylinder with corresponding topology.

U.S. Pat. No. 3,961,119 describes a procedure for manufacturing two-ply sheets embossed on cylinders with distinct helical engravings. Mutually parallel ribs are produced on each of the plies. The two plies are combined where the ribs intersect. To prevent bonding the full ply surface in the zone of the engraving flats, projections are provided where the helices of the two cylinders come into contact. Accordingly, the bonding cylinder deposits adhesives only onto the projections. However, aside from the complexity in making such embossing cylinders, this technical solution in practice is unsatisfactory.

The adhesive-depositing cylinder is smooth. It receives adhesive over its entire surface, but transfers adhesive only onto the few zones of the paper which are formed by the projections. Therefore, the residual adhesive on the cylinder surface will dry. Moreover, the cylinder traps dust and fibers, thus tending toward fouling. Fiber and adhesive agglomerates can detach and be dragged along by the sheet, causing damage to the cylinder surface.

The object of the present invention is a method of depositing adhesive using a bonding apparatus free of the drawbacks of the prior art, that is, an apparatus allowing bonding by zones and operating reliably without the need for frequent shutdowns to clean the depositing cylinder.

The depositing method of the invention for an adhesive diluted in a solvent, such as water, onto a substrate, such as a paper sheet in particular made of cellulose wadding and supported on and moving with a rotary cylinder, using an apparatus comprising at least one reservoir of adhesive and one cylinder to deposit the reservoir adhesive onto the substrate is characterized in that the cylinder is relief-free and in that it comprises first and second zones at its surface, the second zones being distinct from the first zones in such a way that the amount of adhesive dragged by the cylinder onto the second zones is greater than the quantity of adhesive dragged onto the first zones.

The expression "relief-free" or "smooth" denotes a cylinder which underwent no processing to change its geometry. It means a cylinder free of projections/recesses visible, i.e., smooth, to the naked eye.

Preferably, the set of first and second zones constitutes the total cylinder surface. The zones can assume any shape, for instance they can be strips, circles or other, and they can be arrayed in an arbitrary pattern which can be uniform or not.

The apparatus of the invention comprises at least one cylinder. In such case, this can be a rastered cylinder with alveole zones of different volumes. The apparatus also can comprise two cylinders, one which draws adhesive from the reservoir, for instance a dipping system or a doctor chamber, and a depositing cylinder. Further, the apparatus of the invention can comprise three cylinders, a metering cylinder located between a cylinder drawing adhesive from the reservoir and a cylinder depositing the adhesive onto a substrate.

When the apparatus comprises at least two cylinders, the cylinder with the above defined first and second zones preferably is the cylinder depositing adhesive onto a substrate.

Thanks to this design solution, the bonding cylinder due to its smoothness is not susceptible to fouling by accumulation of local matter. Moreover, the division into zones allows non-uniform adhesive deposition onto a substrate. At one limit, the first zones thereby can be adhesive-free. Preferably, however, the cylinder is adhesive-coated over its entire surfaces. In such a case, the thickness of the adhesive layer is greater in the second zones than in the first zones. Wettability is the ability of the surface to attract the fluid under consideration.

Accordingly, the adhesive can be deposited in a non-uniform manner onto the substrate in relation to the selected pattern of the first and second zones without incurring the risk of undesired accumulation of material. Also, the entire cylinder surface remains wetted and the adhesive does not dwell long enough on the cylinder surface to dry. No amalgam is formed.

In a particular feature of the invention, the second zones are prepared by suitable local treatment of the cylinder surface by imparting to them higher wettability for the adhesive diluted in a solvent, in particular water, than the remainder of the surface which thus constitutes the first zones.

Another object of the invention is a deposition apparatus of which the cylinder depositing adhesive onto a substrate is clad by an elastomer and the second zones evince a rastered surface constituted of alveoles made by engraving the cladding.

Another object of the invention is a bonding method for two sheets of paper or other similar product using an adhesive diluted in a solvent, such as water, and applied by a bonding cylinder, whereby it is possible to minimize the stiffening caused by the bonds between the sheets. According to the invention, this method is characterized in that the adhesive is deposited onto one of the paper sheets according to first and second zones such that the quantity of adhesive deposited on the first zones is less than a limit value at which a bond would be formed between the two sheets and such that the quantity of adhesive deposited on the second zones is greater than the limit value and thus shall ensure bonding between the two paper sheets.

Illustratively, the second zones are selected in the form of circles arbitrarily distributed over the surface of the paper sheets so that the layered product when made may be cut into sheets of a desired format such as sanitary paper.

The limit value of adhesive diluted in water, or another solvent if appropriate, deposited on the paper sheets depends for a given substrate on the nature of the adhesive used. The limit value corresponds to the maximum quantity deposited between the sheets at which these sheets will separate from one another while offering only very slight resistance to delamination.

Other features and advantages of the present invention are elucidated in the description below of an illustrative and non-limiting implementation of the invention and in relation to the drawings.

FIG. 1 schematically shows known equipment for embossing and bonding two strips of cellulose wadding.

Figure 1:
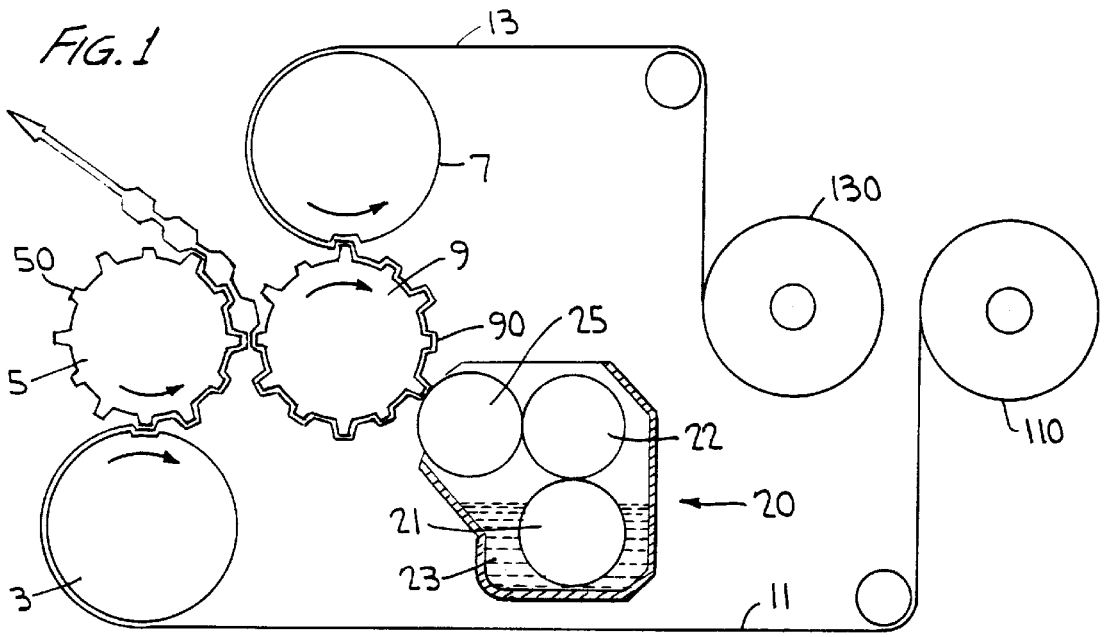

The illustrated embossing equipment 1 comprises a first embossing unit consisting of a rubber-clad cylinder 3 and of a metal-clad embossing cylinder 5 with projections 50 at its surface. The projections are shown much exaggerated for the sake of clarity. The equipment furthermore comprises a second embossing unit with a rubber cylinder 7 and an embossing cylinder 9 with projections 90. The two embossing cylinders 5 and 9 run on mutually parallel axes and subtend between them a slight space, and rotate at synchronous speeds in opposite directions so that their respective projections are at least partly mutually opposite along a tangent line but without making contact.

A first cellulose-wadding sheet 11 unwound from a spool 110 is guided around the cylinder 3 and then is embossed by passing inside the contact zone of the two cylinders 3 and 5. This sheet remains forced against cylinder 5 of which the sheet assumes the mating topology. In the bonding zone between cylinders 5 and 9, sheet 11 combines with a second sheet 13 coming from a spool 130 and which underwent the same embossing between cylinders 7 and 9. Sheet 13 was coated beforehand with adhesive by the bonding apparatus 20 on its projecting, embossed parts.

In the shown embodiment, the deposition apparatus 20 comprises a dipping cylinder 21 drawing adhesive from a receptacle 23, a steel metering-cylinder 22, and a deposition cylinder 25 clad with rubber or another elastomer. The apparatus also may comprise two cylinders and the dipping cylinder can be replaced by a zone arrayed cylinder fed by a doctor chamber. Cylinder 21 is driven at a specified speed of rotation relative to that of cylinder 25, which is covered with an adhesive film, by being in gentle contact with the surface of the metering cylinder 22. Next, the adhesive is deposited on those parts of the paper sheet which are in contact with the film formed at the surface of the cylinder 25. The rotational speed of cylinder 25 is such that no slippage takes place when the sheet makes contact. Be it borne in mind, that in order to avert any undesirable sheet-dragging by the bonding cylinder, a minimum play must be maintained between them which is slightly less than the film thickness. The flow of adhesive and the film thickness as well as the quantity of adhesive transferred onto the paper are regulated by selecting an appropriate metering cylinder zone array, i.e., depth and alveole geometry, or else a specific ratio of cylinder speeds. In general, a flow allowing as slight a deposition as possible while still being sufficient to provide bonding between the sheets shall be selected. The objective is to stiffen the sheet as little as possible. This is an important criterion for a sanitary or household absorbing paper. For these sorts of applications, flexible and soft products are desired.

Once the quantity of deposited adhesive is specified, the sheet stiffness will depend on the number and on the surface of the bonding zones between the sheets. For instance, in the illustrated mode of implementation, these bonding zones correspond to the contact zones between the projections of two sheets.

In particular, if the embossing patterns of the two sheets are identical in dimensions and spacing, there will be as many bonds as there are projections. However, if the number of projections is high, the product shall be stiff even if the quantity of adhesive is reduced to the limit value at which bonding no longer takes place between the sheets. Reduction of this drawback has been attempted by selecting embossing patterns with repeats having different pitches, for instance in the manner described in applicant's French Patent Document No. 89-14202; whereby, the number of bonding sites is decreased and the sheet flexibility is advantageously improved. However, efforts to upgrade this product characteristic are still in progress.

Now the apparatus of the invention allows reducing the number of bonding zones regardless of the pitch of the selected embossing patterns for the two sheets and without having to resort to a bonding cylinder with an uneven surface which evinces the drawbacks cited in the present application's preamble.

It has been noted that, all other conditions being equal, the quantity of adhesive dragged along by the bonding cylinder depends on the cylinder's surface condition and on its wettability. This wettability is for an adhesive diluted in a solvent, in particular water.

The exposition below refers to wettability to water, although wettability to a given solvent is to be understood.

In a preferred mode of implementation, the invention consists in processing the surface of the cylinder 25 so as to leave it topologically uniform, i.e., smooth, while achieving zones of different wettabilities on the surface. In this manner, different quantities of adhesive will be deposited on the substrate.

Such processing can be carried out in many ways. Illustratively, photo-etching a polymer in a known printing procedure, such as the DuPont & Nemours CYRELL method or the Grace FLEXLIGHT method, can be used, or mechanical means can be employed whereby standard rubber inserts are implanted on a silicone-rubber drum, or, more generally, the zones can be cladded differently, or also paint can be applied. Such procedures as above do not imply limitation and any thermal, chemical or mechanical processing known to the expert is also included.

Another procedure which can be used for making a bonding cylinder of the invention involves cladding the cylinder with a first base layer constituted of a material evincing high affinity for the adhesive. This layer shall be machined so as to form projections distributed according to the desired pattern. Next, a second layer of a second material is deposited on the first layer by filling the gaps between the projections. This second material is selected not to be wetted, or to be wetted less, by the adhesive. Lastly, the cylinder is dressed until the projections are flush with the surface. In this manner, a smooth cylinder will be achieved which evinces different wettability zones relative to the adhesive.

Figure 2:
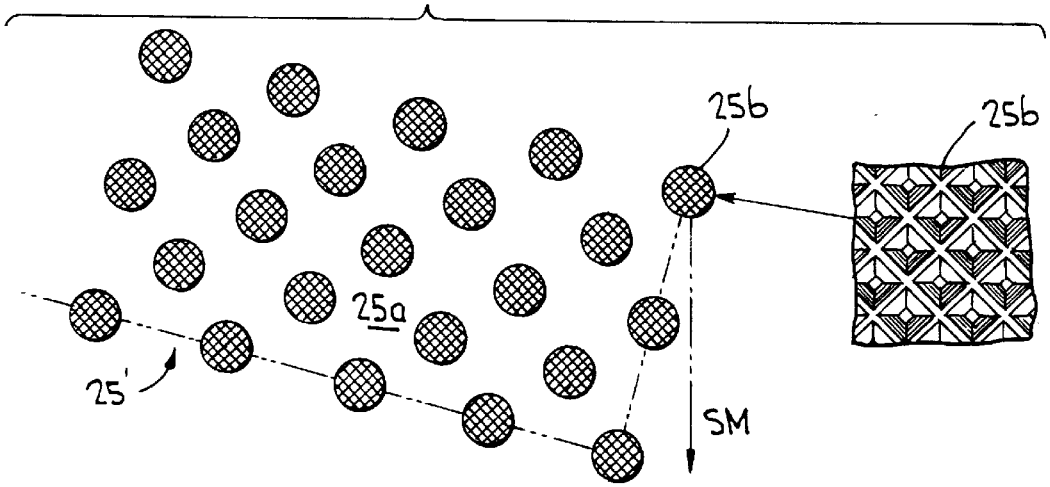
FIG. 2 shows the geometrically developed surface of a bonding cylinder of the invention with one of the second zones being shown on an enlarged scale.

FIG. 2 is a geometric development of a surface portion of a bonding cylinder 25' of one embodiment of the invention. First zones 25a and second zones 25b are defined on this smooth cladding. The second zones 25b were engraved using an appropriate tool, for instance a laser beam, and they evince microscopic alveoles abutting each other and are of a given capacity able to retain a quantity of adhesive larger than the unengraved cladding. That portion of the cladding not taken up by the second zones constitutes the first zones. Their wettability is that of the unprocessed cladding.

The cylinder 25' operates in the same manner as the cylinder 25 of the prior art. However, in the light of the above discussion, the adhesive film thickness is higher in the second than in the first zones. When the sheet of paper comes into contact with the film so formed, its tangential speed relative to the cylinder 25' being zero, the quantity of adhesive being absorbed will solely depend on the film thickness at the location of contact and will be greater the thicker the film. Accordingly, a pattern of first and second zones corresponding to the pattern of the bonding cylinder 25 will also appear on the sheet.

It is understood that a given desired result, namely partial bonding, can be achieved by ensuring that the adhesive flow from the cylinder 25' at the locations of the first zones shall be less than the limit value at which the adhesive deposited onto the paper secures adequate and subsequent bonding to the second sheet, and that it shall be greater than the limit value in the second zones. This adhesive flow can be selected to be zero in the first zones. Preferably, however, the full surface of cylinder 25' is wetted to prevent overheating which would degrade equipment operation.

The present invention is especially advantageous when two embossed sheets must be bonded of which the specific projection density is between 4 and 100 projections per $cm^2$, in particular when the density is greater than 20 $cm^2$ covering 5% of the surface.

EXAMPLE

A bonding cylinder of the invention was used on a pilot line.

A bonding cylinder was fitted with an elastomer of which the properties were selected to evince the required mechanical strengths, in particular abrasion resistance, and satisfactory behavior with respect to laser engraving, that is, ease of laser processing and good surface quality following engraving.

The cladding hardness is of the same order of magnitude as that of the bonding cylinders presently used in production. It is 60 shore A.

The cladding was engraved to form shallow cavities of 40 to 60 $\mu$m and to form thereby a regular raster with a density of 120 lines/cm. Cladding zones in the shape of 15 mm diameter circles were processed in this manner. These zones form a raster with the zones staggered behind one another at a pitch of 40 mm. Furthermore, in order to prevent channel formation lacking adhesive in the direction of advance, the pattern is sloping relative to the direction of advance by an angle between 0° and 45°.

Tests were run using this bonding cylinder in an embossing and bonding pilot line. The embossing pattern was uniformly distributed at a density of 55 tips per $cm^2$. It was found that zone-wise sheet-bonding could be achieved by appropriately adjusting the flow of adhesive.

In this implementation, the adhesive used was in a ratio of 70% water to 30% polyvinyl-alcohol based adhesive diluted in water. The viscosity was approximately 85 centipoises.

Determining Zone-wise Bonding

Initially a standard, unprocessed bonding cylinder was used and several test samples were made by adjusting the flow of adhesive to different values starting with a reference flow corresponding to a total coating of x ($g/cm^2$), where x is between 0.01 and 1. Samples were made which correspond to flows 0.2, 0.4, 0.6, 0.8 and 1.0 of this value.

A cellulose-wadding paper with a specific density of 17 $g/m^2$ was used for those samples.

The adhesive-coated parts were made visible by staining using a suitable developer for the kind of adhesive used. For instance, for PVA adhesive, the developer is iodine-based. Therefore, the bonded surfaces were stained more or less darkly depending on the quantity of adhesive present.

Following black-and-white photographic printing, the quantity of deposited adhesive was quantified by using an image analyzer in terms of the gray values relative to a white reference card corresponding to an adhesive-less surface.

A gray value corresponding to the quantity of deposited adhesive was thus obtained for each of the five samples.

Figure 3:
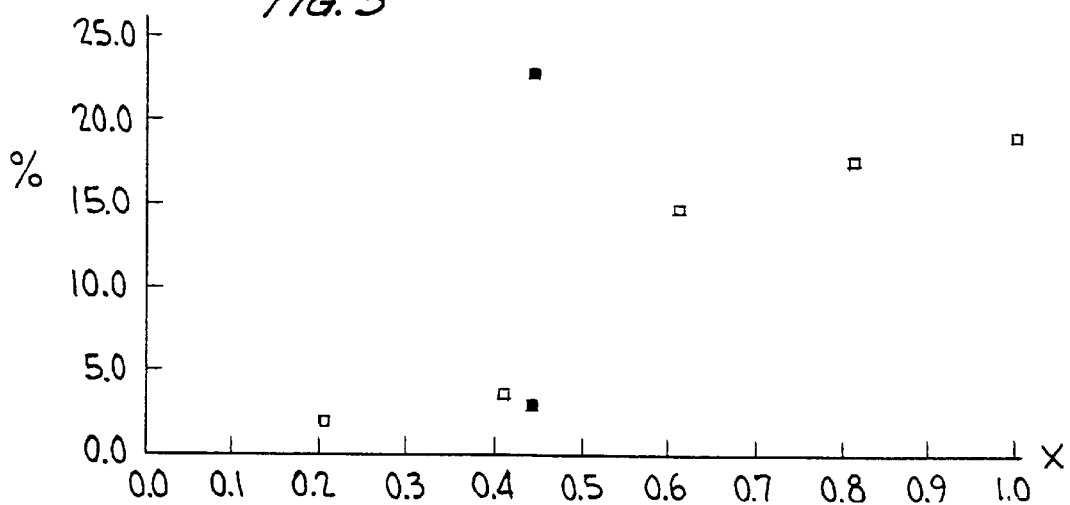
FIG. 3 is a plot of which the ordinate is the quantity of adhesive, expressed as a percentage of a gray value (see description below), effectively deposited on a substrate as a function of the applicator's adhesive flow which is shown on the abscissa as a fraction of a reference flow.

FIG. 3 is a plot of the tests and is shown on normalized scales with the adhesive flow as abscissa and the gray values in % as the ordinate.

It is clear that in the experiment, the sheets remained bonded to each other when the flow was regulated to be 0.6. The gray value measured for that magnitude is 15% as indicated on the plot. For a gray value less than 15%, the quantity of adhesive is insufficient to provide bonding.

Next, the standard bonding cylinder was replaced by a cylinder of the invention as described above.

A paper sample identical with the preceding ones was bonded and the bonding apparatus was adjusted in such a manner that the adhesive flow was approximately 0.4. This represents a theoretical flow less than that required in theory to form bonding.

It was observed with respect to the first zones that the gray value indeed was less than 15%. On the other hand, the second zones showed a gray value of 25%, i.e., substantially above the limit value at which bonding begins.

In this manner, it was proven that non-uniform bonding can be achieved whereby the sheet will be coated totally but wherein only the second zones will be effective.

We claim:

1. A method for depositing at least one adhesive diluted in a solvent onto a substrate for bonding said substrate to a second substrate comprising depositing said at least one adhesive diluted in a solvent onto a substrate by means of a deposition apparatus comprising a reservoir containing said at least one adhesive diluted in a solvent and a rotating cylinder for transferring said at least one adhesive from said reservoir onto said substrate, wherein said rotating cylinder comprises a relief-free surface having first zones and second zones such that said at least one adhesive is deposited onto the first zones in an amount which is less than an amount sufficient to form a bond between said substrate and a second substrate and said at least one adhesive is deposited on the second zones in an amount which is greater than an amount sufficient to form a bond between said substrate and a second substrate, thereby bonding said substrate to said second substrate.

2. A method according to claim 1 wherein said solvent is water.

3. A method according to claim 1 wherein said substrate is a paper sheet.

4. Method according to claim 1 wherein the second zones have an adhesive-wettability greater than the first zones.

5. Method according to claim 1 further comprising regulating flow of said at least one adhesive from the rotating cylinder so that the at least one adhesive deposited from said second zones of the rotating cylinder is in an amount sufficient to bond said substrate to a second substrate and the at least one adhesive deposited from the first zones is in an amount which is insufficient to bond said substrate to a second substrate.

6. Method according to either claim 1 or claim 5 wherein at least one substrate of said substrate and said second substrate is embossed and the at least one adhesive is deposited onto embossments of said at least one substrate.

7. Method according to claim 6 wherein the embossments are present in a density of 4–100/cm$^2$.

8. Apparatus to implement the method according to claim 1 wherein said rotating cylinder is clad with an elastomer and said second zones are prepared by processing the rotating cylinder's surface to impart to the second zones greater wettability to the at least one adhesive diluted in a solvent than the wettability of said first zones on said rotating cylinder.

9. Apparatus according to claim 8 wherein the second zones of the rotating cylinder have a surface constituted of alveoles engraved in the elastomer.

10. A product produced according to the method of either claims 1 or 5 comprising two embossed substrates having a density of embossments between 4 and 100/cm$^2$.

11. A product produced according to the method of claim 6 comprising two embossed substrates having a density of embossments between 4 and 100/cm$^2$.

* * * * *